US012770581B2

(12) United States Patent
Pieri et al.

(10) Patent No.: US 12,770,581 B2
(45) **Date of Patent: *Oct. 20, 2026**

(54) DISPLAYS WITH CONTENT-SPECIFIC HEADROOM

(71) Applicant: Apple Inc., Cupertino, CA (US)

(72) Inventors: Elizabeth Pieri, Menlo Park, CA (US); Teun R Baar, Cupertino, CA (US); Jackson K Roland, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/039,443

(22) Filed: Jan. 28, 2025

(65) Prior Publication Data

US 2025/0174205 A1 May 29, 2025

Related U.S. Application Data

(63) Continuation of application No. 18/353,985, filed on Jul. 18, 2023, now Pat. No. 12,230,224.

(60) Provisional application No. 63/401,071, filed on Aug. 25, 2022.

(51) Int. Cl.
*G09G 3/34* (2006.01)

(52) U.S. Cl.
CPC ......... *G09G 3/3413* (2013.01); *G09G 3/3426* (2013.01); *G09G 2320/0276* (2013.01); *G09G 2320/0646* (2013.01); *G09G 2320/066* (2013.01); *G09G 2360/144* (2013.01); *G09G 2360/16* (2013.01)

(58) Field of Classification Search
CPC ............... G09G 3/2003; G09G 3/2007; G09G 3/34–3426; G09G 2320/0233; G09G 2320/0271; G09G 2320/0276; G09G 2320/06; G09G 2320/0613; G09G 2320/062; G09G 2320/0646; G09G 2320/066; G09G 2320/0666; G09G 2320/0673; G09G 2360/144; G09G 2360/16
See application file for complete search history.

(56) References Cited

U.S. PATENT DOCUMENTS 10,390,009 B1 * 8/2019 Chen ...................... G09G 3/006
2018/0330674 A1 * 11/2018 Baar .................... G09G 3/3406
2021/0020140 A1 * 1/2021 Li ............................ G09G 5/10

* cited by examiner

*Primary Examiner* — Nathan Danielsen
(74) *Attorney, Agent, or Firm* — Treyz Law Group, P.C.; Kendall P. Woodruff

(57) ABSTRACT

An electronic device may be provided with a display. The display may be configured to display standard dynamic range image content and high dynamic range image content at the same time. The control circuitry may dynamically adjust an amount of headroom for the high dynamic range image content to avoid washing out the standard dynamic range image content. For example, the control circuitry may reduce the amount of headroom available for high dynamic range image content with high average pixel luminance levels and low screen coverage. The headroom may be increased as the average pixel luminance levels decrease and/or as screen coverage increases. Different high dynamic range images that are displayed at the same time may be assigned different amounts of headroom (e.g., different peak brightness levels) based on average pixel luminance values, screen coverage, whether or not the content is within an active window on the display, etc.

20 Claims, 8 Drawing Sheets

DISPLAYS WITH CONTENT-SPECIFIC HEADROOM

This application is a continuation of patent application Ser. No. 18/353,985, filed Jul. 18, 2023, which claims the benefit of provisional patent application No. 63/401,071, filed Aug. 25, 2022, both of which are hereby incorporated by reference herein in their entireties.

FIELD

This relates generally to electronic devices, and, more particularly, to electronic devices with displays.

BACKGROUND

Electronic devices often include displays. Some displays may be used to display high dynamic range images and standard dynamic range images. If care is not taken, standard dynamic range images may appear dark and washed out in the presence of high dynamic range images.

SUMMARY

An electronic device may be provided with a display. The display may be configured to display standard dynamic range image content and high dynamic range image content at the same time. The control circuitry may dynamically adjust an amount of headroom for the high dynamic range image content to avoid making the standard dynamic range image content appear too dark. For example, the control circuitry may reduce the amount of headroom available for high dynamic range image content with high average pixel luminance levels and low screen coverage. The headroom may be increased as the average pixel luminance levels decrease and/or as screen coverage increases. High dynamic range image content with low enough average pixel luminance values and/or high enough screen coverage may be assigned maximum headroom, whereas headroom may be constrained when standard dynamic range image content dominates most of the available real estate and/or when the high dynamic range image content is mostly bright images with high average pixel luminance values.

Different high dynamic range images that are presented on the display at the same time may be assigned different amounts of headroom (e.g., different peak brightness levels) based on average pixel luminance values associated with each high dynamic range image, screen coverage of each high dynamic range image, whether or not the high dynamic range image is within an active or selected window, etc.

DETAILED DESCRIPTION

An electronic device may include a display. The display may be configured to display images that contain standard dynamic range image content and high dynamic range image content. In some image frames, the standard dynamic range image content and high dynamic range image content may be displayed at the same time. If care is not taken, the presence of high dynamic range image content can make the standard dynamic range image content appear too dark, due to the difference in brightness between the "white" in the standard dynamic range content and the "white" in the high dynamic range content. This difference in peak brightness levels between standard dynamic range image content and high dynamic range image content is sometimes referred to as headroom. To mitigate this effect, control circuitry in the electronic device may be configured to dynamically adjust the amount of headroom available for high dynamic range image content based on various factors such as average pixel luminance levels (e.g., average pixel luminance levels of the high dynamic range content and/or average pixel luminance levels of the standard dynamic range image content), screen coverage, which image content is associated with an active or selected window, whether the image content is displayed in a grid view or an embedded view, whether the image content is displayed in a full-screen mode or a split-screen mode, which application is being used to display the image content (e.g., a photo editing or movie editing application versus a messaging application), display mode (e.g., whether the display is operating in a light versus dark display mode), user settings and/or user preferences, and/or other factors.

As an example, the control circuitry may reduce the amount of headroom available for high dynamic range image content when the average pixel luminance level of the high dynamic range image content is high and the amount of screen covered by the high dynamic range image content is low to avoid making the standard dynamic range image content appear too dark. As the pixel luminance level of the high dynamic range image content decreases and/or the amount of screen covered by the high dynamic range image content increases, the control circuitry may increase the available headroom for the high dynamic range image content, since the standard dynamic range image content is less likely to appear too dark in these scenarios.

Figure 1:
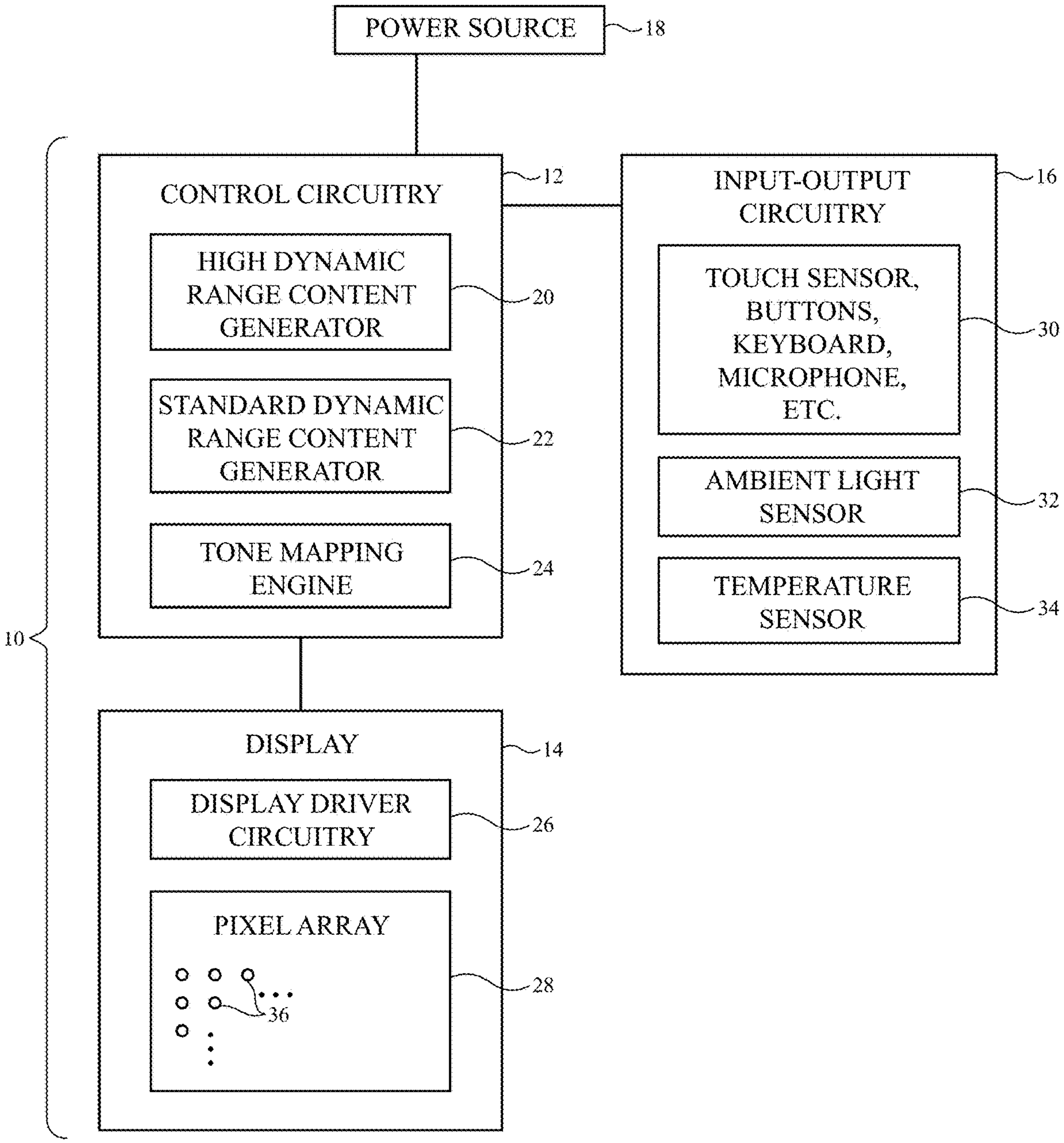
FIG. 1 is a schematic diagram of an illustrative electronic device having a display in accordance with an embodiment.

An illustrative electronic device of the type that may be provided with a display is shown in FIG. 1. As shown in FIG. 1, electronic device 10 may have control circuitry 12. Control circuitry 12 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application-specific integrated circuits, graphics processing units, display driver circuitry such as timing controller integrated circuits and other display driver integrated circuits, and other control circuitry.

Control circuitry 12 is configured to execute instructions for implementing desired control and communications features in device 10. For example, control circuitry 12 may be used in determining pixel luminance levels that are to be used in displaying content for a user. Pixel luminance levels may be based, for example, on ambient light conditions, user-adjusted display brightness settings, statistical information associated with content that is being displayed, and display characteristics. Control circuitry 12 may be configured to perform these operations using hardware (e.g., dedicated hardware such as integrated circuits and thin-film circuits) and/or software (e.g., code that runs on control circuitry 12). Software code for performing control and communications operations for device 10 may be stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 12 during operation of device 10.

Input-output circuitry 16 in device 10 may be used to allow data to be supplied to device 10 from a user or external equipment, may be used to gather environmental data, and may be used to supply data to external equipment and output for a user. Input-output circuitry 16 may include input-output devices 30 such as buttons, joysticks, scrolling wheels, touch pads, key pads, keyboards, microphones, speakers, tone generators, vibrators, cameras, sensors, light-emitting diodes and other status indicators, touch sensitive displays (e.g., touch sensors overlapping pixel arrays in displays), data ports, etc. As shown in FIG. 1, input-output circuitry 16 may include a color ambient light sensor or other ambient light sensor 32 for gathering ambient light measurements (e.g., ambient light levels such as ambient light luminance measurements and/or ambient light color measurements such as color temperature measurements and/or color coordinate measurements). Input-output circuitry 16 may also include temperature sensor circuitry such as one or more temperature sensors. Temperature sensors such as temperature sensor 34 may be used to gather real time information on the operating temperature of device 10 and display(s) associated with device 10.

Power may be supplied to control circuitry 12 and other resources in device 10 using one or more power sources such as power source 18. Power source 18 may be an alternating-current (AC) source such as a wall outlet (mains supply) and/or a direct-current (DC) source such as a battery. During operation, control circuitry 12 can detect whether power is being received from an AC or DC source and can monitor the charge state of the battery.

Device 10 may include one or more internal and/or one or more external displays such as illustrative display 14. Display 14 may be mounted in a common housing with device 10 (e.g., when device 10 is a mobile device such as a cellular telephone, wristwatch device, tablet computer, or laptop computer or when device 10 is an all-in-one device such as a television or desktop computer). In other configurations, display 14 may be coupled to device 10 wirelessly or with a cable (e.g., when device 10 is a desktop computer or a set-top box).

In general, device 10 may be any suitable type of device. Device 10 may, for example, be a computing device laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. Device 10 (e.g., a portable device) may be exposed to a variety of environmental conditions. For example, ambient light levels and therefore display glare may vary as a portable device is moved between indoors and outdoors environments (as an example).

Electronic device 10 may have a housing. The housing, which may sometimes be referred to as an enclosure or case, may be formed of plastic, glass, ceramics, fiber composites, metal (e.g., stainless steel, aluminum, etc.), other suitable materials, or a combination of any two or more of these materials. The housing may be formed using a unibody configuration in which some or all of the housing is machined or molded as a single structure or may be formed using multiple structures (e.g., an internal frame structure, one or more structures that form exterior housing surfaces, etc.). In laptop computers and other foldable devices, a first portion of the housing may rotate relative to a second portion of the housing (e.g., a display housing in a laptop computer may rotated about a hinge axis relative to a base housing in the laptop computer).

Display 14 may be mounted in the housing. Display 14 may have a rectangular outline and be surrounded by four peripheral edges, may have a shape that is circular or oval, or may have other suitable outlines. Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may have an array 28 of pixels 36 for displaying images for a user (e.g., video, graphics, text, etc.). Display driver circuitry 26 (e.g., thin-film transistor circuitry on display 14 and/or one or more timing-controller integrated circuits and/or other display driver integrated circuits) may be used to display images on pixel array 28. Pixel array 28 may include, for example, hundreds or thousands of rows and hundreds or thousands of columns of pixels 36. To display color images, each pixel 36 may include subpixels of different colors. For example, each pixel 36 may include, red, green, and blue subpixels or subpixels of different colors. By varying the relative intensity of light emitted by each subpixel in a pixel, pixel output color can be adjusted. The color cast (white point) of each pixel can be adjusted by modifying the gain associated with each subpixel.

The pixel array of display 14 may be formed from liquid crystal display (LCD) components, an array of electrophoretic display pixels, an array of plasma display pixels, an array of organic light-emitting diode pixels or other light-emitting diodes, an array of electrowetting display pixels, or pixels based on other display technologies. Display 14 may be backlit with an array of locally dimmable light-emitting diodes or other suitable backlight structures. Display 14 may display images with a standard dynamic range (e.g., images that exhibit a contrast ratio of about 1,000:1 between their brightest and darkest pixel luminance values) and/or may display images with a high dynamic range (e.g., images that exhibit a contrast ratio of about 10,000:1 or more between their brightest and darkest luminance values).

During operation, content generators in device 10 (e.g., operating system functions and/or applications running on control circuitry 12) may generate content for display on the pixel array of display 14. As an example, electronic device 10 may include one or more standard dynamic range (SDR) content generators and/or more high dynamic range (HDR) content generators (e.g., content generators that generate high dynamic range content in accordance with one or more different high dynamic range standards such as the HDR10 Media Profile standard, sometimes referred to as HDR10 and the Hybrid Log-Gamma standard, sometimes referred to as HLG). A luminance value mapping engine such as tone mapping engine 24 may be used to provide content generators with tone mapping parameters (sometimes referred to as luminance value mapping parameters) indicating how the content generators should map content luminance values to display luminance values and/or may be used to directly perform content-luminance-to-display-luminance mapping operations on content luminance values from the content generators. For example, tone mapping engine 24 may supply content generators with tone mapping parameters such as a black level, reference white level, specular white level, skin tone level, and/or gamma and/or slope values to use in producing display luminance values for use in displaying images with pixels 36. Tone mapping engine 24 may be implemented using code running on control circuitry 12 of FIG. 1, control circuitry for device 10 such as display driver circuitry 26, and/or other control circuitry and/or may use hardwired features of the control circuitry in device 10.

Standard dynamic range content is often encoded in gray levels (e.g., 0-255 bits), where 0 corresponds to dark black and 255 corresponds to bright white. High dynamic range content is encoded in luminance levels for each pixel (generally to be displayed for standard viewing conditions such as dim viewing conditions). Device 10 may experience changes in ambient lighting conditions, user brightness settings may be adjusted up and down by a user, the content being displayed on display 14 may exhibit changes such as changes in average pixel luminance, and burn-in risk, and other conditions related to the presentation of content on display 10 may change over time. Device 10 may use tone mapping engine 24 to ensure that content is rendered appropriately for displaying on display 14 in view of these potentially changing conditions and other criteria such as the characteristics of display 14.

Device 10 may use tone mapping, gain maps, look-up tables, and/or other techniques to achieve the desired brightness levels across display 14. In a tone mapping arrangement, control circuitry 12 (e.g., tone mapping engine 24) may be used to map content luminance values to display luminance values using tone mapping curves. The tone mapping curve that is used to map a given set of content luminance values to display luminance values may be selected based on display brightness settings (e.g., a user-selected brightness level, an ambient-light-adapted brightness level, etc.) and/or may be based on user studies, modeling, and laboratory testing that helps establish desired tone mapping schemes for device 10 under a variety of operating conditions (e.g., user brightness settings, ambient light levels, and other operating conditions). These tone mapping schemes can then be implemented by tone mapping engine 24.

With one illustrative configuration, tone mapping engine 24 can select a desired tone mapping curve based on operating conditions such as display brightness settings (e.g., user-defined brightness settings and brightness levels set by device 10 to accommodate a normal power operating mode and a low-power operating mode), ambient conditions (ambient light level and ambient light color), content statistics (e.g., information on average pixel luminance and burn-in risk or other information on operating conditions having a potential impact on display lifetime, quality information, dynamic range information etc.), and display characteristics (e.g., display limitations such as maximum achievable pixel luminance, power constraints such as those due to thermal limitations and/or other considerations), whether device 10 is operating on DC power (power from the battery in source 18 of device 10) or AC power, etc.

During operation, tone mapping engine 24 may obtain information on these operating conditions and may take suitable action to ensure that display 14 displays images satisfactorily. Tone mapping engine 24 may, as an example, remap content so that luminance values that are too high when output from a content generator are reduced by engine 24 before these values are used by display 14. In some situations, luminance values associated with specular highlights of high dynamic range image content may be reduced to avoid making the white of standard dynamic range image content that is being displayed at the same time as the high dynamic range image content appear too dark. Tone mapping engine 24 may also provide content generators such as content generators 20 and/or 22 with tone mapping parameters that inform the content generators of a desired content-luminance-to-display-luminance mapping curve to be used in displaying images on display 14.

If desired, control circuitry 12 may use tone mapping parameters to define content-luminance-to-display-luminance mapping curves. Tone mapping parameters may include a black level, a reference white level, and specular white level. During operation, engine 24 may supply content generators such as content generators 20 and/or 22 with suitable values of these tone mapping parameters, thereby informing content generators 20 and/or 22 of the appropriate tone mapping curve to use. In this way, a set of tone mapping parameters (e.g., three or more tone-mapping parameters, 3-10 tone-mapping parameters, fewer than 5 tone-mapping parameters, etc.) can be used by engine 24 to specify a desired tone mapping relationship for the content generator to follow depending on current operating conditions. If a skin tone mapping parameter is used, its value may, as an example, lie between the reference white level and specular white level or between the reference white level and the black level and may represent skin tones common to human skin. Gamma and/or curve slope values may also be used as tone mapping parameters that specify a content-luminance-to-output-luminance mapping curve.

Tone mapping engine 24 may determine tone mapping parameters based on input such as ambient conditions, brightness settings information, content statistics, and display characteristics. Ambient conditions may include a current ambient light level measured with ambient light sensor 32 and/or a current ambient color (e.g., a color temperature, set of color coordinates, etc.) measured with ambient light sensor 32. As environmental brightness increases, display brightness can be increased to compensate for screen glare. As environmental color shifts (e.g., as a user moves device 10 from a warm indoor lighting environment to a cold outdoor lighting environment), the white point (color cast) of display 14 can be cooled accordingly to avoid undesired color cast effects in displayed images.

Brightness settings information may include a user-selected brightness level and may include a brightness level determined by control circuitry 12 based on power consumption considerations. User brightness settings may be adjusted based on user input from a user on a touch screen, based on user keyboard input, and/or based on other user input. Power-consumption-based brightness level adjustments may be made by control circuitry 12 to help extend battery life. For example, control circuitry 12 may lower the brightness level for display 14 when device 10 enters a low power mode due to thermal conditions such as in response to detection that a temperature level measured with sensor 34 has exceeded a predetermined level, due to detection of a low battery level measured with control circuitry 12, based on detection that a user has placed device 10 in a low power mode to extend battery life, etc. In low power mode, control circuitry 12 may lower the current display brightness setting, may impose a cap on the brightness level, and/or may reduce the luminance of specular highlights or may make other adjustments that help reduce the power consumption of display.

Content statistics may be gathered by analyzing frames of image data produced by content generator(s) 20 and 22 that are being displayed on display 14 or may be provided in the form of metadata (e.g., content category information such as, for example, "movie" or "live sports"). Control circuitry 14 (e.g., a microprocessor, display driver integrated circuits, graphics processing unit circuitry, and/or other control circuitry in device 10) may, for example, maintain running averages of image luminance values (e.g., a running average pixel luminance value for images being displayed on display 14 over multiple image frames) and/or may maintain historical luminance information in a more granular fashion (e.g., on blocks of one or more pixels within pixel array 28) to quantify risks for each of these blocks (e.g., risk of washing out standard dynamic range image content, burn-in risk, etc.). Other content statistics such as information on content quality such as bit depth, dynamic range of image input data (e.g., minimum, mean, and maximum value), compression type and amount, data rate, noise level, metadata-specified quality factors, and other content quality metrics can also be gathered and provided to tone mapping engine 24.

Display characteristics may also be used by tone mapping engine 24. Display characteristics may include information on physical display limitations for display 14. For example, display characteristics may include information on the characteristics of pixel array 28 and display 14 (e.g., maximum achievable specular white level, display resolution, contrast ratio, bit depth, etc.). These display characteristics may be stored in control circuitry 12 during manufacturing (e.g., when display 14 is built into device 10) and/or may be obtained from display 14 when display 14 is coupled to device 10 (e.g., when display 14 is a stand-alone display). A user may also supply control circuitry 12 with display characteristics information (e.g., by entering this information using a keyboard or other input-output device). In some configurations, display characteristics may be set by default and/or retrieved from a database of display characteristics maintained in device 10 (e.g., a database of stand-alone display models).

During operation, content generators 20 and 22 may produce content to be displayed on display 14. Content generators 20 and 22 may, for example, render game images in a video game, may retrieve stored movie data and provide corresponding video frames to be displayed on display 14, may produce still image frames associated with an operating system function or application program, and/or may produce other content for displaying on display 14. The content from content generators 20 and 22 may include standard dynamic range content and/or high dynamic range content.

Tone mapping engine 24 may use information on ambient conditions, brightness settings information, content statistics, and/or display characteristics to determine how original content values should be mapped to display content values (e.g., to determine how to map content luminance values to display luminance values in accordance with mapping curves). To ensure that content is displayed appropriately on display 14, tone mapping engine 24 can provide content generators 20 and 22 with tone mapping parameters to use in performing luminance mapping operations and/or can implement luminance mapping for content generators 20 and 22.

In some configurations, content generators 20 and 22 may be capable of adjusting content luminance values internally. In these situations, tone mapping engine 24 can supply content generators 20 and 22 with tone mapping parameters such as a black level, reference white level, specular white level, skin tone level, and the slope or gamma of the mapping curve. The tone mapping parameters inform content generators 20 and 22 of an appropriate mapping curve to use in supplying content to display 14.

In other configurations, tone mapping engine 24 may apply a desired content-luminance-to-display-luminance mapping (e.g., a mapping defined by tone mapping parameters such as black level, reference white level, and specular white level) to ensure that the luminance of display content is adjusted appropriately (e.g., so that the content is remapped in accordance with a desired content-luminance-to-display luminance mapping to produce corresponding remapped content for displaying on display 14).

In some situations, only standard dynamic range content from standard dynamic range content generator 22 is displayed on display 14. Standard dynamic range content generator 22 may be associated with displaying standard video and images, on-screen menus, pop-up boxes, selectable on-screen buttons, text documents (e.g., in word processing applications), web pages (e.g., in web browser applications), standard dynamic range graphics, user interface elements, and other standard dynamic range content. In these situations, a tone mapping may be selected so that the standard dynamic range content is displayed satisfactorily on display 14. As an example, the standard dynamic range content may be displayed with a maximum luminance (specular white level, peak brightness value, etc.) that is lower than the maximum possible pixel luminance supported by the hardware of display 14. This approach may help conserve power while displaying the content for a user.

In other situations, only high dynamic range content from high dynamic range content generator 20 is displayed on display 14. The high dynamic range content supplied by high dynamic range content generator 20 has a higher dynamic range than the standard dynamic range content from standard dynamic range content generator 22. To take advantage of the larger dynamic range associated with the content from content generator 20 (e.g., to ensure that specular highlights are sufficiently bright for a viewer), a tone mapping may be selected that allows the brightest pixels in the high dynamic range content to be displayed with elevated luminance levels relative to the brightest pixels in the standard dynamic range content. In other words, the brightest white used for high dynamic range content (e.g., the specular highlights in a high dynamic range photograph) may be higher than the brightness white used for standard dynamic range content (e.g., the white background of a webpage that is displayed by a web browser application, the white background of a text document that is displayed by a word processing application, etc.).

It is sometimes desirable to display content that has one or more areas of standard dynamic range content and one or more areas of high dynamic range content. For example, high dynamic range picture-in-picture content may be displayed on standard dynamic range background content using a picture-in-picture arrangement. The background content may, for example, extend across all of display 14. The picture-in-picture content may partly cover the background content. As an example, the picture-in-picture content may be displayed in a rectangular area that overlaps some of the background area while allowing other portions of the background area to be viewed by a user.

In another illustrative arrangement, a split-view window approach may be used in which high dynamic range content on one side of display 14 (e.g., the left side) is simultaneously displayed with standard dynamic range content on another side of display 14 (e.g., the right side). Slide-over content arrangements in which an area of standard dynamic range content slides over and progressively covers increasing portions of a high dynamic range area on display 14 or in which high dynamic range content slides over standard dynamic range content on display 14 may also be used. In some arrangements, standard dynamic range text such as text for editing buttons, subtitles, and closed captioning information may be overlaid on high dynamic range content.

When standard dynamic range and high dynamic range areas are displayed simultaneously, the black level, reference white level, and specular white level for each of these areas can be independently adjusted to ensure that the content on display 14 is presented satisfactorily (e.g., to avoid situations in which some of the content appears too dark or too bright compared to other content, to avoid situations in which white standard definition text appears grayish rather than white when adjacent to content with bright specular highlights, etc.). For example, tone mapping engine 24 can detect when mixed standard dynamic range and high dynamic range is being presented (or is about to be presented) on display 14 and can generate corresponding standard dynamic range and high dynamic range tone mapping parameters that balance the appearances of the standard dynamic range and high dynamic range areas to avoid undesired visual effects while taking into account factors such as ambient light conditions, content statistics, user brightness settings, and display characteristics. Transitions between standard dynamic range and high dynamic range content can be performed smoothly by dynamically adjusting tone mapping parameter values while transitioning. For example, if high dynamic range content with a high specular white level is being replaced by standard dynamic range content with a low specular white level, the specular white level can be transitioned between the high and low levels over a suitable transition period (e.g., 0.5-20 s, 0.5-50 s, 0-50 s, 1-100 s, more than 3 s, less than 20 s, or other suitable transition period) to avoid an overly abrupt transition. When operating conditions change (e.g., an ambient light level changes), the sets of respective tone mapping parameters associated with standard dynamic range area(s) on display 14 and high dynamic range area(s) can be adjusted accordingly.

Figure 2:
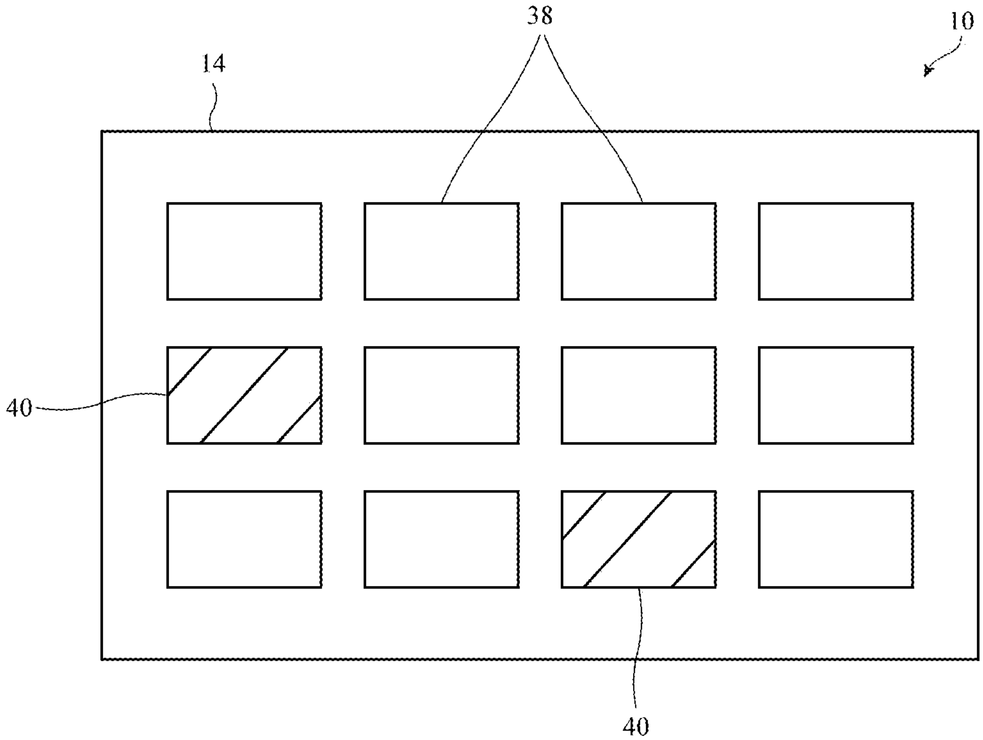
FIG. 2 is a front view of an illustrative display that is displaying standard dynamic range image content and high dynamic range image content with a first amount of headroom in accordance with an embodiment.

Consider, as an example, the display content of FIG. 2. In the example of FIG. 2, display 14 is being used to display both standard dynamic range image content 38 and high dynamic range image content 40. If the difference between the white level (e.g., the peak brightness value) of high dynamic range image content 40 and the white level (e.g., the peak brightness value) of standard dynamic range image content 38 is too high (e.g., if the headroom for high dynamic range image content 40 is too high), standard dynamic range image content 38 may appear washed out and gray. The contrast between the two white levels may be more or less noticeable depending upon the relative amounts of screen coverage of standard dynamic range image content 38 and high dynamic range image content 40. In particular, the difference may become more noticeable when high dynamic range image content 40 consumes less screen real estate (e.g., a lower percentage of screen coverage) within the image frame than standard dynamic range image content 38, as in the example of FIG. 2 (e.g., when display 14 is displaying thumbnail images of photographs that include both high dynamic range photographs and standard dynamic range photographs). As such, control circuitry 12 may reduce the amount of headroom available for high dynamic range image content 40 as the screen coverage of high dynamic range image content 40 decreases relative to standard dynamic range image content 38 (or relative to some threshold amount of screen coverage).

If desired, control circuitry 12 may determine headroom for high dynamic range image content 40 based on spatial statistics such as the size of the highlight region in high dynamic range image content 40. Images with larger size highlights (e.g., larger groups of bright pixels clustered together) may have a more perceivable effect on the appearance of surrounding standard dynamic range content 38 than images with smaller highlights. Control circuitry 12 may therefore assign lower amounts of headroom to for high dynamic range image content 40 with larger size highlights when compared to high dynamic range image content 40 with smaller highlights.

Average pixel luminance levels may also play a factor in determining how noticeable the difference between the peak brightness levels of standard dynamic range image content 38 and high dynamic range image content 40. If, for example, high dynamic range image content 40 has relatively low average pixel luminance levels (e.g., if high dynamic range image content 40 is mostly dark image content), the difference between the two peak brightness levels may be less noticeable than in scenarios in which the high dynamic range image content 40 has relatively high pixel luminance levels (e.g., in which high dynamic range image content 40 is mostly light image content). Control circuitry 12 may reduce the amount of headroom available for high dynamic range image content 40 as the average pixel luminance level increases, if desired.

In the example of FIG. 2, standard dynamic range image content 38 consumes most of the screen real estate available, while high dynamic range image content 40 has relatively low screen coverage. If the average pixel luminance levels of high dynamic range image content 40 are relatively low, the difference between the two peak brightness levels may not be noticeable, so control circuitry 12 may use a maximum amount of headroom for high dynamic range image content 40 or may only slightly reduce the amount of headroom for high dynamic range image content 40 in that scenario. If the average pixel luminance levels of high dynamic range image content 40 are relatively high, the difference between the two peak brightness levels may be more noticeable, so control circuitry 12 may reduce the amount of headroom for high dynamic range image content 40 in that scenario.

If display 14 is displaying high dynamic range images or videos with different amounts of screen coverage and/or different levels of average pixel luminance at the same time, control circuitry 12 may use different amounts of headroom for the different high dynamic range images and videos. For example, high dynamic range image content 40 within a given image frame displayed on display 14 may include first and second high dynamic range images or videos (e.g., first and second high dynamic range thumbnail images as in the example of FIG. 2, multiple high dynamic range videos, a combination of high dynamic range videos and images, etc.) with different levels of average pixel luminance. Control circuitry 12 may use a higher amount of headroom for the darker high dynamic range image or video (e.g., the thumbnail image, video, or other content with lower average pixel luminance) and may use a lower amount of headroom for the lighter high dynamic range image or video (i.e., the thumbnail image, video, or other content with higher average pixel luminance).

Headroom may be continuously adjustable between a minimum headroom amount (e.g., zero headroom in which the white level of high dynamic range image content 40 has the same brightness as the white level of standard dynamic range image content 38, or a minimal amount of headroom in which the white level of high dynamic range image content 40 has a brightness that is only moderately brighter than the white level of standard dynamic range image content 38) and a maximum headroom amount (e.g., when the brightness of the white level of high dynamic range image content 40 is three, four, five, ten, sixteen, less than sixteen, or more than sixteen times greater than the brightness of the white level of standard dynamic range image content 38), or the headroom may be adjustable between discrete stops. For example, one stop of headroom may indicate that the peak brightness of high dynamic range content 40 is two times greater than the peak brightness of standard dynamic range image content 38; two stops of headroom may indicate that the peak brightness of high dynamic range image content 40 is four times greater than the peak brightness of standard dynamic range image content 38; three stops of headroom may indicate that the peak brightness of high dynamic range image content 40 is eight times greater than the peak brightness of standard dynamic range image content 38; four stops of headroom may indicate that the peak brightness of high dynamic range image content 40 is sixteen times greater than the peak brightness of standard dynamic range image content 38; etc.

When transitioning between different amounts of headroom, tone mapping parameters can be changed gradually to prevent undesired visual artifacts (e.g., undesired jumps in image brightness). For example, when transitioning from high dynamic range content with a first amount of headroom to high dynamic range content with a second amount of headroom, control circuitry 12 may gradually transition between tone mapping curves while the high dynamic range content is displayed so as to avoid an abrupt change in image brightness.

The use of tone mapping to achieve the desired peak brightness level for high dynamic range image content (e.g., headroom) is merely illustrative. If desired, target peak brightness levels for high dynamic range image content may be achieved using a gain map (e.g., a local adjustment), using average pixel luminance constraints (e.g., by constraining the average pixel luminance of high dynamic range image content 40), peak luminance constraints, and/or using other techniques. Imposing headroom constraints using tone mapping may sometimes be described herein as an illustrative example.

In general, when both standard dynamic range content and high dynamic range content are displayed simultaneously on display 14, the mapping curve used for presenting the standard dynamic range content and/or the mapping curve used for presenting the high dynamic range content may be adjusted to present the content in a visually appealing fashion while taking into account current operating conditions such as ambient light level, user brightness setting, content statistics, and display characteristics. Instead of or in addition to adjusting the tone mapping curve used for high dynamic range image content 40, control circuitry 12 may adjust the tone mapping curve used for standard dynamic range image content 38 to make standard dynamic range image content 38 appear brighter and less dark in comparison to high dynamic range image content 40.

The use of average pixel luminance and screen coverage to determine headroom for high dynamic range image content 40 is merely illustrative. If desired, other factors may be taken into account to determine headroom such as which image content is associated with an active or selected window, whether the image content is displayed in a grid view (e.g., a grid of thumbnail images as in the example of FIG. 2) or an embedded view (e.g., a picture-in-picture arrangement, an image sent in an e-mail or messaging application, etc.), whether the image content is displayed in a full-screen mode or a split-screen mode, which application is being used to display the image content (e.g., a photo editing or movie editing application versus a messaging application), user settings and/or user preferences, and/or other factors.

In some arrangements, the average pixel luminance of standard dynamic range image content 38 may be taken into account when determining headroom for high dynamic range image content 40. If standard dynamic range image content 38 is mostly dark (e.g., with relatively low average pixel luminance values), the presence of high dynamic range image content 40 with bright whites may have little effect on the appearance of the surrounding dark standard dynamic range image content 38. As such, headroom for high dynamic range image content 40 may remain at a maximum or may be only slightly reduced. On the other hand, if the standard dynamic range image content 38 is mostly light (e.g., with relatively high average pixel luminance values), the presence of high dynamic range image content 40 with bright whites may wash out the surrounding light-colored standard dynamic range image content 38. In this type of scenario, control circuitry 12 may restrict the headroom of high dynamic range image content 40 so that standard dynamic range image content 38 does not appear gray.

Figure 3:
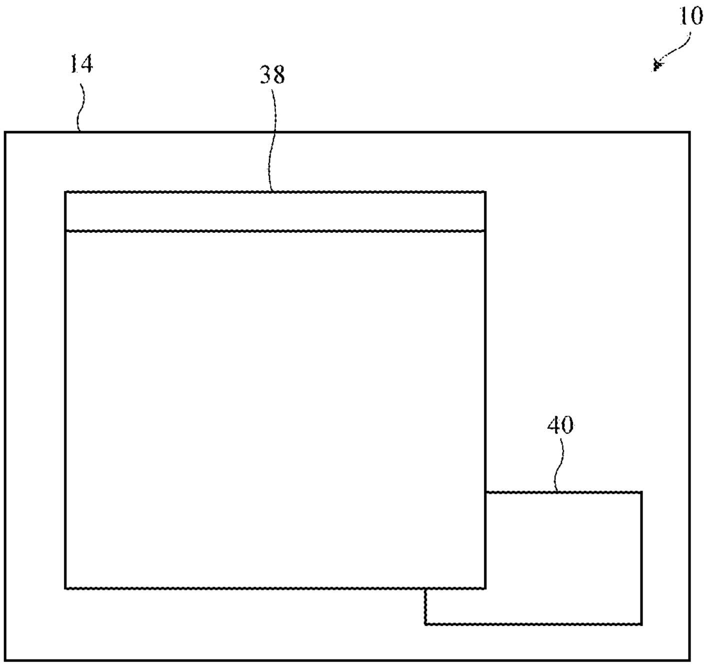
FIG. 3 is a front view of an illustrative display that is displaying standard dynamic range image content and high dynamic range image content with a second amount of headroom in accordance with an embodiment.

FIG. 3 shows an illustrative example in which the screen coverage of high dynamic range image content is increased relative to the thumbnail image size of FIG. 2. As the relative amount of screen coverage of high dynamic range image content 40 increases (e.g., from 5% screen coverage to 20% screen coverage), control circuitry 12 may gradually increase the available headroom for high dynamic range image content 40 (e.g., from 1 stop to 2 stops, from 2 stops to 3 stops, etc.). Control circuitry 12 may consider other factors such as which content is actively being viewed or which content is within an active, selected window (e.g., in front of other image content) and which content is within a passive, unselected window (e.g., behind other image content). If device 10 includes gaze tracking circuitry, control circuitry 12 may use the gaze tracking circuitry to determine which content is aligned with the user's gaze position. In other arrangements, control circuitry 12 may determine which window is active or in front of other content versus which windows are not active or behind other content.

In the example of FIG. 3, standard dynamic range image content 38 is located in an active, selected window that is in front of other image content. High dynamic range image content 40 is located in an unselected window that is behind other image content. In this type of scenario, the appearance of standard dynamic range image content 38 may be more noticeable to a user than the appearance of high dynamic range image content 40, so control circuitry 12 may restrict the available headroom for high dynamic range image content 40. Control circuitry 12 may balance competing factors such as increased screen coverage (which would otherwise warrant an increase in headroom) and the fact that content 40 is not within a selected window (which would otherwise warrant a decrease in headroom) to determine the appropriate amount of headroom for high dynamic range image content 40.

Figure 4:
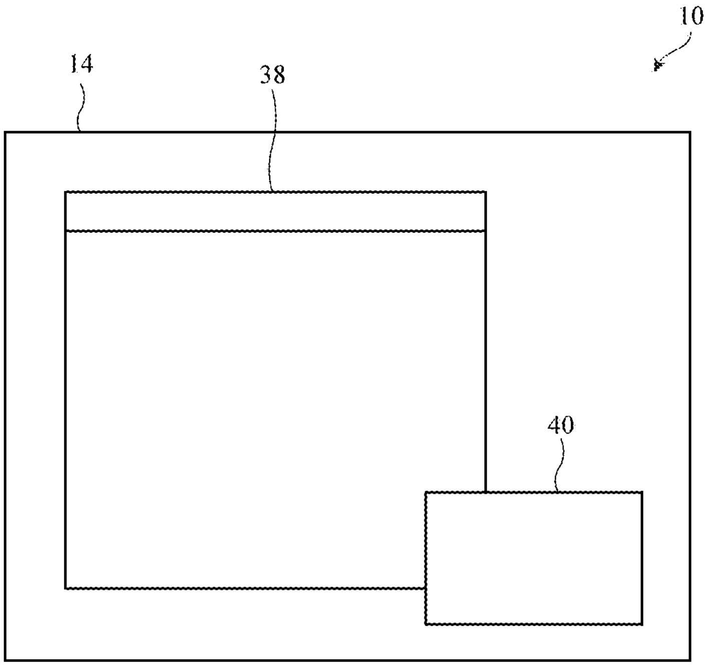
FIG. 4 is a front view of an illustrative display that is displaying standard dynamic range image content and high dynamic range image content with a third amount of headroom in accordance with an embodiment.

In the example of FIG. 4, high dynamic range image content 40 is located in an active, selected window that is in front of other image content. Standard dynamic range image content 38 is located in an unselected window that is behind other image content. In this type of scenario, the appearance of high dynamic range image content 40 may be more noticeable to a user than the appearance of standard dynamic range image content 38, so control circuitry 12 may increase the available headroom for high dynamic range image content 40.

Figure 5:
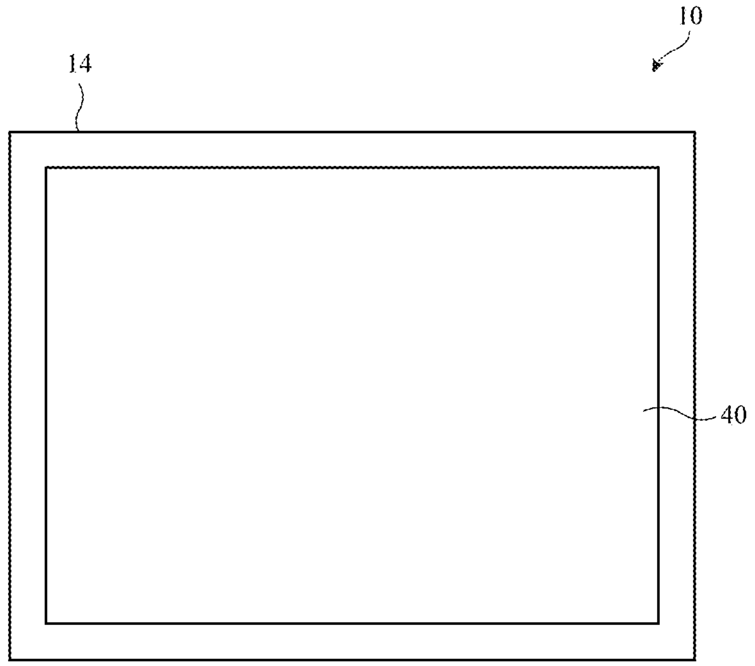
FIG. 5 is a front view of an illustrative display that is displaying standard dynamic range image content and high dynamic range image content with a fourth amount of headroom in accordance with an embodiment.

In the example of FIG. 5, display 14 is being used to display high dynamic range image content 40 in full-screen mode or in nearly full-screen mode. Since there is no standard dynamic range image content present in the image frame, control circuitry 12 may use the maximum available headroom (or a relatively high amount of headroom) for high dynamic range image content 40. Control circuitry 12 may also take into account the application that is being used to view high dynamic range image content 40. For example, if high dynamic range image content 40 is being displayed by a photo editing application, a movie editing application, or other applications that benefit from the ability to display brighter specular highlights, control circuitry 12 may use a maximum available headroom (or a relatively high amount of headroom), even in the presence of standard dynamic range content in the same image frame.

Figure 6:
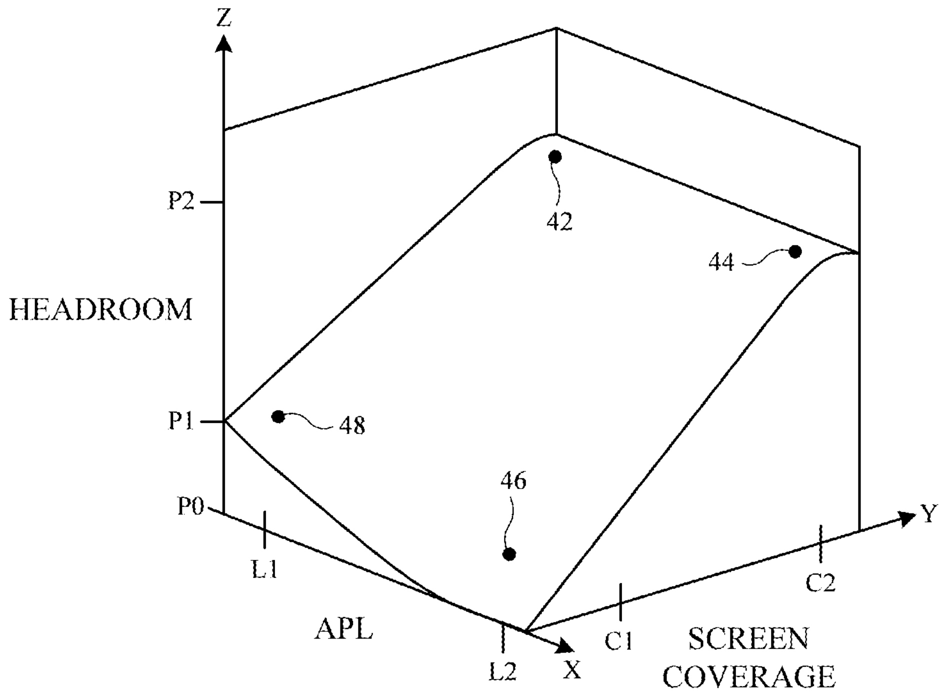
FIG. 6 is a graph showing how an amount of headroom for high dynamic range image content may be adjusted based on display content such as average pixel luminance levels and screen coverage in accordance with an embodiment.

FIG. 6 is a graph showing how headroom for high dynamic range image content may vary depending on the average pixel luminance values and screen coverage associated with the high dynamic range image content. As shown in FIG. 6, headroom for high dynamic range image content may increase as the amount of screen coverage of the high dynamic range image content increases, and may decrease as the average pixel luminance level associated with the high dynamic range image content increases.

As examples, point 46 may represent high dynamic range image content that has a relatively high average pixel luminance level at L2 and a relatively low screen coverage at C1. This may include, for example, high dynamic range image content 40 of the type shown in FIG. 2 (e.g., bright high dynamic range thumbnail images in an array of mostly standard dynamic range thumbnail images). In this type of scenario, the standard dynamic range image content is at higher risk of appearing washed out in the presence of the bright high dynamic range images on the screen. Since the high dynamic range image content is mostly light and consumes little screen real estate, control circuitry 12 may use a relatively low amount of headroom such as headroom P0 for high dynamic range image content at point 46 (e.g., 1 stop of headroom such that the peak brightness of high dynamic range image content 40 is two times greater than the peak brightness of standard dynamic range image content 38).

Point 48 may represent high dynamic range image content that has relatively low average pixel luminance level at L1 and relatively low screen coverage at C1. This may include, for example, high dynamic range image content 40 of the type shown in FIG. 2, such as dark high dynamic range thumbnail images in an array of mostly standard dynamic range thumbnail images. In this type of scenario, the standard dynamic range image content is at lower risk of appearing washed out because the high dynamic range image content is mostly dark. Since the high dynamic range image content is mostly dark and consumes little screen real estate, control circuitry 12 may use a moderate amount of headroom such as headroom P1 for high dynamic range image content at point 48 (e.g., 2 stops of headroom such that the peak brightness of high dynamic range image content 40 is four times greater than the peak brightness of standard dynamic range image content 38).

Point 44 may represent high dynamic range image content that has a relatively high average pixel luminance level at L2 and relatively high screen coverage at C2. This may include full-screen or nearly full-screen high dynamic range images. Since the high dynamic range image content consumes most of the screen real estate, there is little risk of washing out standard dynamic range image content, so control circuitry 12 may use a relatively high amount of headroom such as headroom P2 for high dynamic range image content at point 44 (e.g., 4 stops of headroom such that the peak brightness of high dynamic range image content 40 is sixteen times greater than the peak brightness of standard dynamic range image content 38).

Point 42 may represent high dynamic range image content that has a relatively low average pixel luminance level at L1 and relatively high screen coverage at C2. This may include full-screen or nearly full-screen high dynamic range images. Since the high dynamic range image content consumes most of the screen real estate, there is little risk of washing out standard dynamic range image content, so control circuitry 12 may use a relatively high amount of headroom such as headroom P2 for high dynamic range image content at point 42 (even though the average pixel luminance level is relatively low at L1).

Figure 7:
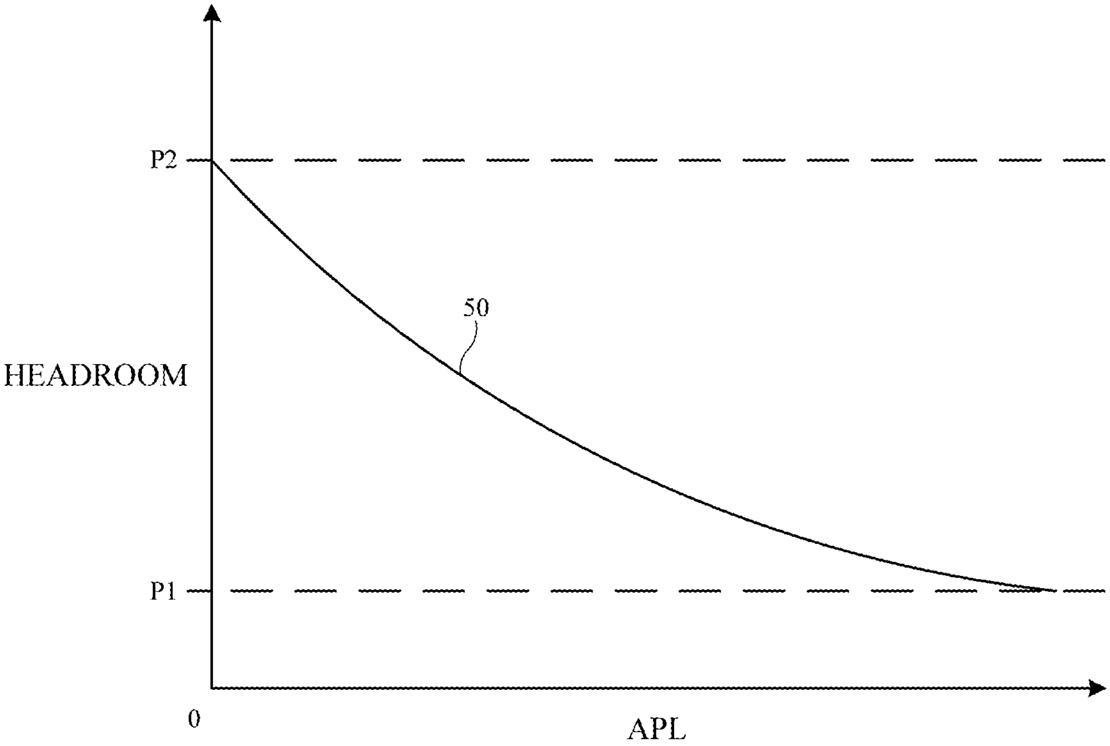
FIG. 7 is a graph showing how an amount of headroom for high dynamic range image content may be adjusted between upper and lower bounds based on average pixel luminance levels in accordance with an embodiment.

FIG. 7 is a graph showing how headroom may vary with average pixel luminance levels. Curve 50 shows how headroom may be decreased as average pixel luminance values increase. For a given piece of high dynamic range image content (e.g., a given high dynamic range image), headroom may be adjustable between a lower bound headroom amount at P1 and an upper bound headroom amount at P2. The values associated with lower bound P1 and upper bound P2 may, for example, be based on screen coverage. For example, lower bound P1 and upper bound P2 may each have values that range from a minimum value to a maximum value based on screen coverage. A higher percentage of screen coverage may increase the value of lower bound P1, whereas a lower percentage of screen coverage may reduce the value of lower bound P1. Similarly, a higher percentage of screen coverage may increase the value of upper bound P2, whereas a lower percentage of screen coverage may reduce the value of upper bound P2.

Figure 8:
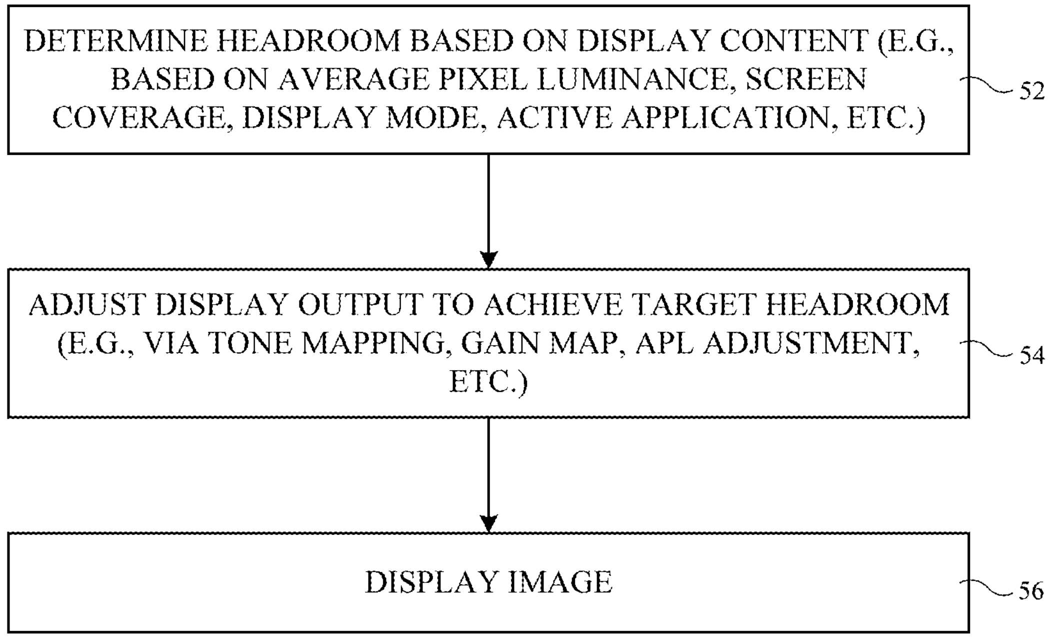
FIG. 8 is a flow chart of illustrative steps involved in displaying images with standard dynamic range image content and high dynamic range image content with adjustable headroom in accordance with an embodiment.

FIG. 8 is a flow chart of illustrative steps involved in displaying images with both standard dynamic range image content and high dynamic range image content with an adjustable amount of headroom.

During the operations of block 52, control circuitry 12 may determine the headroom for one or more high dynamic range images on display 14. For example, if the frame of image content on display 14 includes standard dynamic range image content with a single high dynamic range image (e.g., a single thumbnail image, a single movie, a single photograph, or other single item of high dynamic range image content), then the operations of block 52 may include determining the headroom for the single high dynamic range image in the frame. If the frame of image content on display 14 includes standard dynamic range image content with two or more high dynamic range images (e.g., a thumbnail image and a movie, two or more photographs, two or more thumbnail images, a movie and a photograph, etc.), then the operations of block 52 may include determining the headroom for the each of the high dynamic range images in the frame. The headroom may be determined based on the characteristics of that particular piece of high dynamic range display content. For example, the average pixel luminance level and screen coverage of each high dynamic range image may be considered to determine an appropriate amount of headroom for that particular high dynamic range image. This may mean that a single frame of display content on display 14 may contain high dynamic range images with different respective amounts of headroom displayed at the same time.

During the operations of block 52, control circuitry 12 may take other factors into account to determine headroom such as which image content is associated with an active or selected window (e.g., as described in connection with FIGS. 3 and 4), the size of the highlight region of the high dynamic range image content 40, what mode display 14 is operating in (e.g., night mode, dark mode, light mode, day mode, or other display modes that use mostly dark or mostly light backgrounds), whether the image content is displayed in a grid view (e.g., a grid of thumbnail images as in the example of FIG. 2) or an embedded view (e.g., a picture-in-picture arrangement, an image sent in an e-mail or messaging application, etc.), whether the image content is displayed in a full-screen mode or a split-screen mode, which application is being used to display the image content (e.g., a photo editing or movie editing application versus a messaging application), what mode display 14 is operating in, user settings and/or user preferences, and/or other factors.

Determining headroom for high dynamic range image content may include determining a peak brightness for the high dynamic range image content. The peak brightness may be expressed in luminance values, in stops (e.g., in multiples of the peak brightness of standard dynamic range image content), in digital pixel values (e.g., 255, 250, etc.), and/or in any other suitable format. High dynamic range image content with low average pixel luminance levels or full-screen coverage may be assigned an unrestricted amount of headroom (e.g., a maximum allowable peak brightness such as four stops or sixteen times the peak brightness of the standard dynamic range image content) because it is unlikely to have any negative effect on the surrounding standard dynamic range image content. High dynamic range image content with high average pixel luminance levels and less than full-screen coverage may be assigned a restricted amount of headroom (e.g., one stop, two stops, etc.). High dynamic range image content with high average pixel luminance levels and low screen coverage may be assigned lower peak brightness values than high dynamic range image content with high average pixel luminance levels and high screen coverage. This is merely illustrative. If desired, full-screen image content may be assigned a restricted amount of headroom. Non-full-screen image content with low average pixel luminance levels may be assigned a moderately restricted amount of headroom, if desired.

During the operations of block 54, control circuitry 12 may adjust display output to achieve the desired amount of headroom for each high dynamic range image on display 14. This may be achieved through tone mapping, gain map strength adjustments, restrictions on average pixel luminance levels, and/or other methods for adjusting the peak allowable brightness of high dynamic range image content. In scenarios where the frame of display data includes multiple high dynamic range images with different amounts of assigned headroom, control circuitry 12 may apply different tone mappings to the different high dynamic range images, may apply different gain map strengths to the different high dynamic range images, or may apply different average pixel luminance constraints to the different high dynamic range images. The peak allowable brightness of standard dynamic range content may remain unchanged (e.g., may remain at a fixed peak brightness and/or may be adjusted based on auto-brightness settings, user settings, ambient light conditions, and/or other factors that are independent of the high dynamic range content on display 14).

During the operations of block 56, the frame of display content including the standard dynamic range image content and the high dynamic range image content may be displayed on display 14. The peak brightness of the high dynamic range image content may be such that the surrounding standard dynamic range image content does not appear gray or washed out.

The foregoing is merely illustrative and various modifications can be made to the described embodiments. The foregoing embodiments may be implemented individually or in any combination.

What is claimed is:

1. An electronic device configured to be worn on a user's head, the electronic device comprising:

a display configured to display standard dynamic range image content and high dynamic range image content at the same time, wherein:

the standard dynamic range image content has a first peak allowable brightness; and the high dynamic range image content has a second peak allowable brightness that is greater than the first peak allowable brightness, wherein a difference between the first peak allowable brightness and the second peak allowable brightness is adjusted based on which application is being used to display the standard dynamic range image content.

2. The electronic device defined in claim 1 wherein the standard dynamic range image content comprises video.

3. The electronic device defined in claim 1 wherein the display comprises organic light-emitting diode pixels.

4. The electronic device defined in claim 1 wherein the difference between the first peak allowable brightness and the second peak allowable brightness is adjusted by adjusting a tone mapping that is applied to the standard dynamic range image content.

5. The electronic device defined in claim 1 wherein the difference between the first peak allowable brightness and the second peak allowable brightness is adjusted using a gain map.

6. The electronic device defined in claim 1 wherein the difference between the first peak allowable brightness and the second peak allowable brightness is adjusted by imposing a restriction on average pixel luminance levels.

7. The electronic device defined in claim 1 wherein the difference between the first peak allowable brightness and the second peak allowable brightness is adjusted based on an amount of screen coverage of the standard dynamic range image content.

8. The electronic device defined in claim 1 wherein the difference between the first peak allowable brightness and the second peak allowable brightness is adjusted based on an average pixel luminance level of the high dynamic range image content.

9. The electronic device defined in claim 1 wherein the difference between the first peak allowable brightness and the second peak allowable brightness is adjusted based on whether the high dynamic range image content is displayed behind or in front of the standard dynamic range image content.

10. The electronic device defined in claim 1 wherein the high dynamic range image content comprises high dynamic range video.

11. An electronic device configured to be worn on a user's head, the electronic device comprising:

a display configured to display standard dynamic range image content and high dynamic range image content at the same time, wherein a headroom of the high dynamic range image content is adjusted based on an amount of screen coverage of the standard dynamic range image content.

12. The electronic device defined in claim 11 wherein the headroom is reduced as the amount of screen coverage of the standard dynamic range image content increases.

13. The electronic device defined in claim 11 wherein the headroom is adjusted based on which application is being used to display the standard dynamic range image content.

14. The electronic device defined in claim 11 wherein the headroom is adjusted based on whether the high dynamic range image content is displayed behind or in front of the standard dynamic range image content.

15. The electronic device defined in claim 11 wherein the display comprises organic light-emitting diode pixels.

16. An electronic device configured to be worn on a user's head, the electronic device comprising:

a display configured to display standard dynamic range image content and high dynamic range image content at the same time, wherein:

the high dynamic range image content has a first amount of headroom when the standard dynamic range image content has a first amount of screen coverage; and the high dynamic range image content has a second amount of headroom that is different than the first amount of headroom when the standard dynamic range image content has a second amount of screen coverage that is different than the first amount of screen coverage.

17. The electronic device defined in claim 16 wherein the first and second amounts of headroom are associated with different tone mapping parameters.

18. The electronic device defined in claim 16 wherein the first and second amounts of headroom are associated with different gain map strengths.

19. The electronic device defined in claim 16 wherein the first and second amounts of headroom are based on which application is being used to display the standard dynamic range image content.

20. The electronic device defined in claim 16 wherein the display comprises organic light-emitting diode pixels.

* * * * *